United States Patent
Bong

(10) Patent No.: US 6,668,902 B2
(45) Date of Patent: Dec. 30, 2003

(54) SUNSHADE APPARATUS FOR AUTOMOBILE

(75) Inventor: Heo Bong, Yongin (KR)

(73) Assignee: Korea Fuel-Tech Corporation, Ansung (KR)

( * ) Notice: Subject to any disclaimer, the term of this patent is extended or adjusted under 35 U.S.C. 154(b) by 0 days.

(21) Appl. No.: 10/128,855

(22) Filed: Apr. 23, 2002

(65) Prior Publication Data

US 2003/0066615 A1 Apr. 10, 2003

(30) Foreign Application Priority Data

Oct. 10, 2001 (KR) ......................................... 2001-62295

(51) Int. Cl.[7] .................................................. B60J 3/00
(52) U.S. Cl. .................... 160/370.22; 160/265; 160/75; 296/97.8
(58) Field of Search ............................. 160/320.22, 265, 160/68, 73, 74, 75, 82, 310; 296/97.8

(56) References Cited

U.S. PATENT DOCUMENTS 5,291,934 A * 3/1994 Ouvrard et al. ............. 160/310
6,052,867 A * 4/2000 Haab et al. ................ 16/87.6 R
2002/0185237 A1 * 12/2002 Walker ........................ 160/191

FOREIGN PATENT DOCUMENTS

| CH | 413311 | * 12/1966 |
| EP | 0 601 454 A1 | 6/1994 |
| GB | 570456 | * 7/1945 |
| KR | 20-0182090 | 3/2000 |

* cited by examiner

Primary Examiner—Blair M. Johnson
(74) Attorney, Agent, or Firm—Michael J. Striker

(57) ABSTRACT

A sunshade apparatus is disclosed. The apparatus includes a motor adapted to be rotated in both directions, a rope drum rotated by the motor, a pair of cables coupled to and wound around the rope drum, a pair of sliders connected to the pair of cables and moved by rotation of the rope drum, a pair of actuating bars pivotably coupled to the pair of sliders and tilted by relative movement of the sliders, a shade bar pivotably coupled to the other ends of the pair of actuating bars, a screen coupled to the shade bar, and a take-up shaft coupled to the other end of the screen and intended to elastically wind the screen. A drive assembly including the motor and the rope drum is mounted in a trunk to be isolated from an interior of an automobile, preventing transmission of noise from the assembly to the interior. The cables are maintained in tightened condition by a simple element, improving operational reliability of the apparatus.

4 Claims, 6 Drawing Sheets

SUNSHADE APPARATUS FOR AUTOMOBILE

BACKGROUND OF THE INVENTION

1. Field of the Invention

The present invention relates to a sunshade apparatus for an automobile which includes a sunshade screen adapted to be unwound and extended from a take-up roll to intercept sunlight transmitted through a rear window of an automobile.

2. Description of the Prior Art

In general, a sunshade apparatus for an automobile is designed to be driven by an electric motor such that a sunshade screen can be conveniently manipulated by a driver seated in a driver's seat to be extended from and wound around a take-up roll.

An electric sunshade apparatus is disclosed in EP Patent No. 601,454, which comprises a stationary rod which is provided at its middle point with an upright rail having a rack, a movable frame which is provided at its middle point with a slider engaged to the rail and having a pinion engaged with the rack of the rail such that the movable frame is slidable up and down relative to the stationary rod, a sunshade screen coupled at its both ends to the stationary rod and the movable frame and wound around the movable frame, and a driving motor connected to the movable frame to rotate the pinion.

In other words, such an electric sunshade apparatus is designed to spread or wind the sunshade screen by the pinion of the movable frame, which is engaged with the rack of the stationary rod and is rotated and thus moved up and down along the rail by the driving motor. Therefore, since a rear window of an automobile is always occupied by the rail having the rack, a rear window becomes unsightly and forms an obstacle to the field of view of a driver.

In addition, since the movable frame having considerable weight due to the pinion, the slider, the driving motor, a gearbox and the wound screen must be raised so as to spread the sunshade screen, the driving motor is applied with high load and considerable electrical energy is required to operate the sunshade apparatus. Furthermore, since the driving motor and the gearbox are positioned inside an automobile, operational noise thereof is directly transmitted inside of an automobile.

To overcome the problems occurring in the above electric sunshade apparatus disclosed in EP Patent No. 601,454, Korean Utility Model Registration No. 0182090 allowed to the inventor has been proposed.

The sunshade apparatus disclosed in Korean Utility Model No. 0182090 is adapted to spread or wind a sunshade screen by raising or lowering a movable rod to which the screen wound around a stationary roll is coupled. More specifically, first and second actuating bars are pivotably connected at upper ends thereof to opposite ends of the movable rod. The first and second actuating bars are also pivotably connected to first and second sliders, which are disposed on a frame to be slid laterally. A pair of idle pulleys are positioned at both sides of the frame. A cable is wrapped over the pair of pulleys, and fixed at its both ends to a driving pulley mounted on the frame with the both ends of the rope being slightly wound around the driving pulley. One of the first and second sliders is fixed to an upper rope section and positioned at one side of the driving pulley, and the other of the sliders is fixed to a lower rope section and positioned at the other side of the driving pulley.

In the sunshade apparatus, when the driving pulley is rotated clockwise or counterclockwise by a driving motor, the first and second sliders are moved toward or away from each other, thereby causing the first and second actuating bars to be inclined or to be erected. Hence, the movable rod is lowered or raised by the tilting movement of the first and second actuating bars, so that the sunshade screen fixed to the movable rod is elastically wound around the stationary roll or extended upwardly.

Although the said sunshade apparatus of the inventor can substantially overcome the problems occurring in the electric sunshade apparatus of EP Patent No. 601,454, since the driving means is mounted on the frame and positioned inside of an automobile, it is impossible to fundamentally overcome a problem caused by the operational noise.

Furthermore, since the power transmission means is comprised of a single wire cable, it is very difficult to provide sufficient tension to the wire cable wrapped over the pulleys, and it is impossible to preserve a precise operation of the device due to relaxation of the wire rope upon use for a long time.

In addition, since extension of retraction of the sunshade screen is fulfilled by only turning force of the driving motor, delayed actuation and overload are caused in an initial operation. Moreover, since assembled components are loosened by vibrations generated during starting and stopping of an operation, operational reliability is lowered.

SUMMARY OF THE INVENTION

Accordingly, the present invention has been made keeping in mind the above problems occurring in the prior art, and an object of the present invention is to provide a sunshade apparatus for an automobile which is provided with driving means such as a driving motor and a gear box generating operational noise, which are installed to be isolated from a frame positioned in an interior of an automobile.

Another object of the present invention is to provide a sunshade screen for an automobile which is provided with power transmission means comprised of several cables having different moving ranges to facilitate tight assembly of the cables.

A further object of the present invention is to provide a sunshade apparatus for an automobile which is improved in operational reliability and durability by increasing initial driving force or reducing vibrations.

In order to accomplish the above object, the present invention provides a sunshade apparatus comprising: a take-up shaft biased by an elastic element to be rotated in a winding direction; a sunshade screen coupled at its one side to the take-up shaft and wound therearound; a shade bar to which the other side of the sunshade screen is coupled; a frame having first and second sliders slidably engaged therewith; first and second actuating bars pivotably coupled at both ends thereof to the shade bar and the first and second sliders; a drive assembly including a driving motor adapted to be rotated in forward and reverse directions, a worm wheel rotated by the driving motor, and a rope drum engaged with the worm wheel and having a helical groove; first and second transmission cables connecting the rope drum and the first and the second sliders and wound around the rope drum, and a mediate cable connecting the first slider and the second slider; and first and second shock absorbers associated with the first and second sliders.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

This invention will be described in further detail by way of example with reference to the accompanying drawings.

Figure 1:
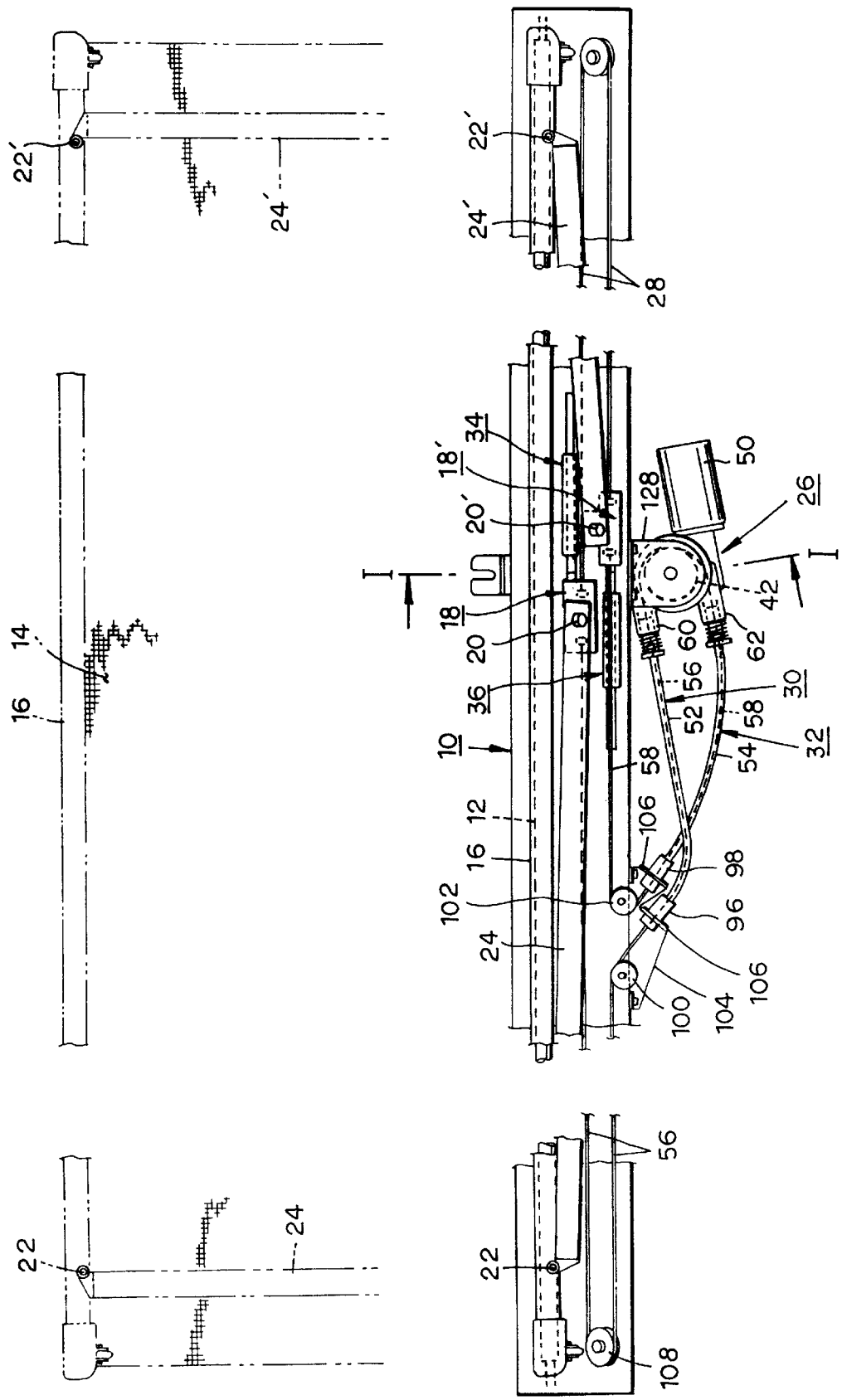
FIG. 1 is a plan view of a sunshade apparatus according to the present invention.
Figure 2:
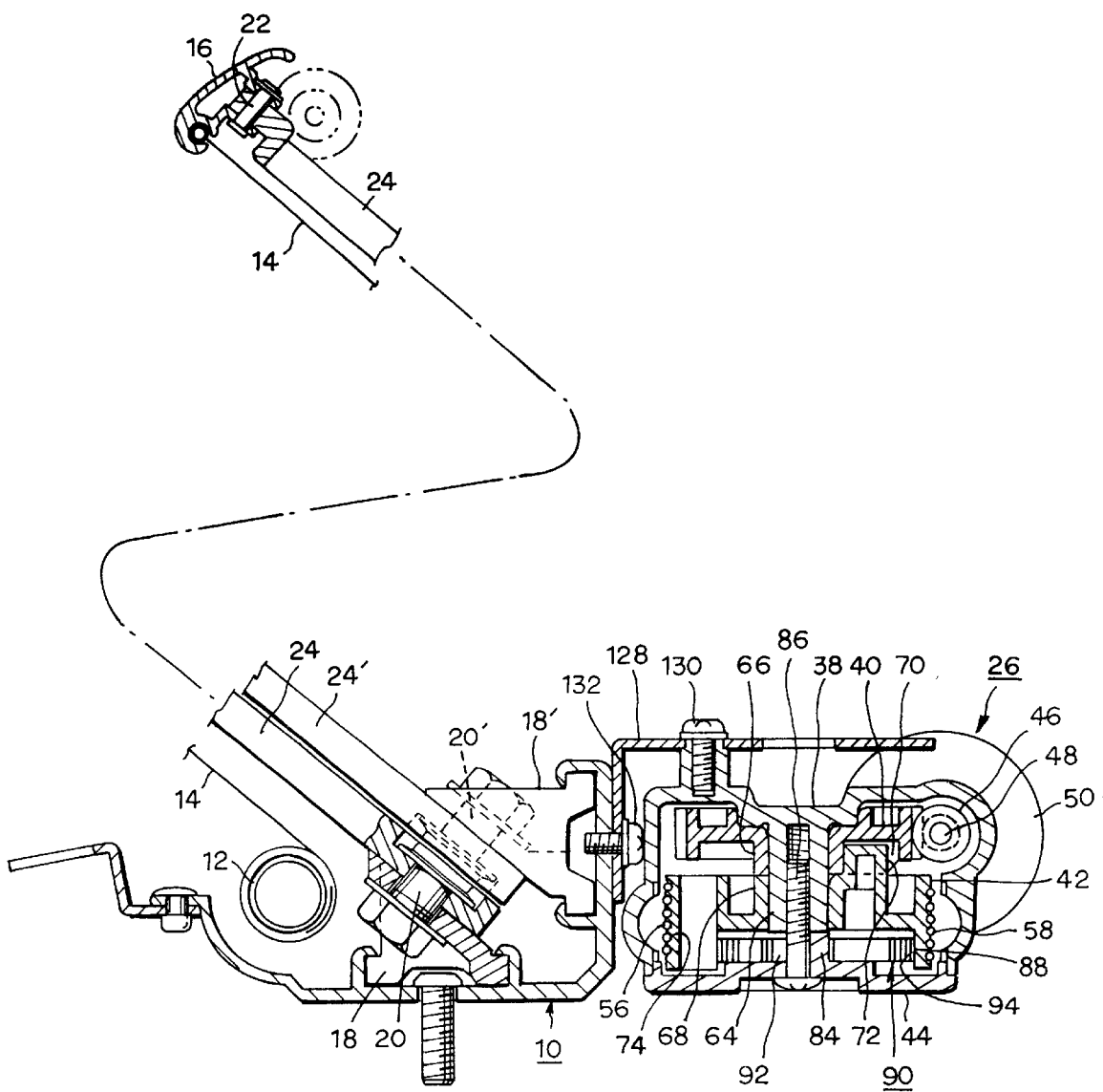
FIG. 2 is an enlarged cross-sectional view taken along line I—I of FIG. 1.

FIGS. 1 and 2 show a sunshade apparatus for an automobile according to the present invention. As shown in the drawings, the sunshade apparatus according to the present invention includes a sunshade screen 14 wound around a take-up shaft 12, which is connected to elastic means such as a torsion spring in a frame 10, a shade bar 16 connected to an upper end of the sunshade screen 14, first and second sliders 18 and 18' engaged with the frame 10 to be longitudinally slidable, and first and second pivoting bars 24 and 24' which are pivotably coupled as lower ends thereof to the first and second sliders 18 and 18' by pivot members 20 and 20', and which are also pivotably coupled at upper ends thereof to opposite ends of the shade bars 16.

A drive assembly 26 is detachably mounted on the frame 10. The first and second sliders 18 and 18' are connected to each other by a mediate cable 28 to be moved together. The first slider 18 is connected to the drive assembly 26 via a first transmission cable 30, and the second slider 18' is connected to the drive assembly 26 via a second transmission cable 32. In the frame 10 is positioned a first shock absorber 34 associated with the first slider 18 and a second shock absorber 36 associated with the second slider 18'.

As shown in FIGS. 2, 3a, 3b and 4, the drive assembly 26 comprises a gear box 38, a worm wheel 40, a rope drum 42, a gear box cover 44, and a worm 46 engaged with the worm wheel 40 is fixed to the shaft 48 of a driving motor 50.

The driving motor 50 is adapted to be rotated in forward and reverse direction.

Figure 3A:
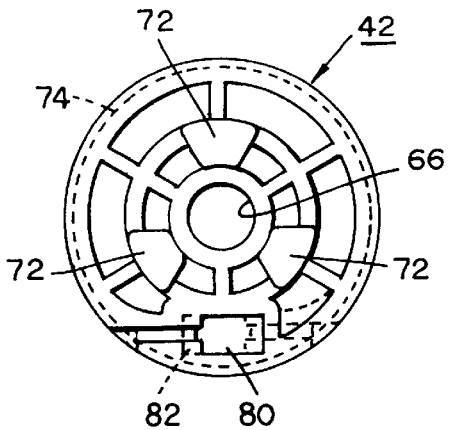
FIG. 3a is a plan view of a rope drum of FIG. 2.
Figure 3B:
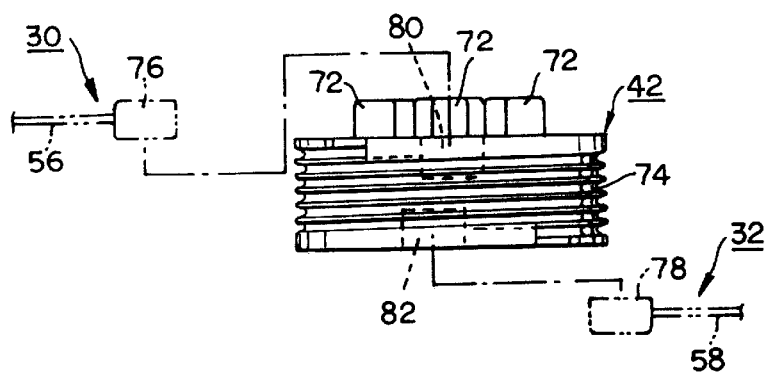
FIG. 3b is a front view of the rope drum of FIG. 2.

As shown in FIG. 1, an external cable 52 of the first transmission cable 30 and an external cable 54 of the second transmission cable 32 are fixed at ends thereof to the gear box 38. As shown in FIGS. 2, 3a and 3b, internal cables 56 and 58 of the transmission cables 30 and 32 are directed to the rope drum 42 by guide tubes 60 and 62 formed at the gear box 38.

As shown in FIG. 2, the gear box 38 is internally provided with a hollow shaft 64 extended downwardly, onto which a boss 66 of the worm wheel 40 and a boss 68 of the rope drum 42 are rotably inserted.

Since the worm wheel 40 is formed at its lower portion with a recess 70, and the rope drum 42 is formed at its upper portion with a protrusion 72, such that the recess 70 and the protrusion 72 are engaged with each other, the rope drum 42 can be rotated with the worm wheel 40.

As shown in FIGS. 2, 3a and 3b, the rope drum 42 is formed at its outer surface with a helical groove 74 into which the internal cable 56 of the first transmission cable 30 and the internal cable 58 of the second transmission cable 32 are wound.

The rope drum 42 is symmetrically provided at its upper and lower end with two nipple recesses 80 and 82 into which nipples 76 and 78 fixed to ends of the internal cables 56 and 58 are fitted.

The gear box cover 44 is centrally provided with a boss 84 corresponding the hollow shaft 64 of the gear box 38, so that the gear box cover 44 is attached to the gear box 38 by means of a screw 86.

Figure 4:
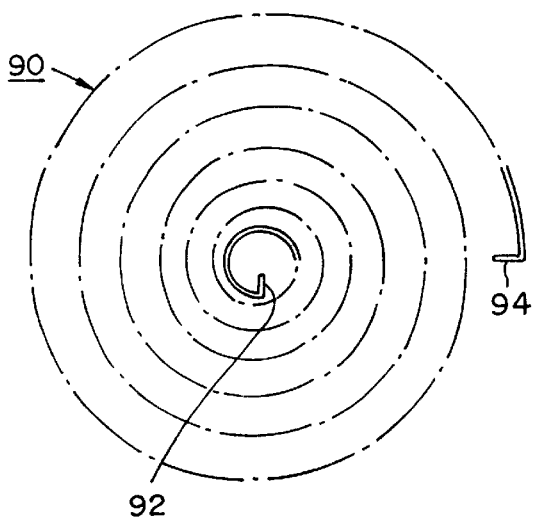
FIG. 4 is a plan view of a spiral spring of FIG. 2.

As shown in FIGS. 2 and 4, a spiral spring 90 is fixed at its inner end 92 to the boss 84 of the gear box cover 44, and fixed at its outer end 94 to an inner surface 88 of the rope drum 42.

That is, when the worm wheel 40 and the rope drum 42 are rotated clockwise by the driving motor 50, the internal cable 56 of the first transmission cable 30 is wound around the rope drum 42 and the internal cable 58 of the second transmission cable 32 is unwound from the rope drum 42 while winding the spiral spring 90. On the contrary, when the worm wheel 40 and the rope drum 42 are rotated counterclockwise, the internal cable 56 of the first transmission cable 30 is unwound from the rope drum 42 and the internal cable 58 of the second transmission cable 32 is wound around the rope drum 42 while unwinding the spiral spring 90 to the normal position.

As shown in FIG. 1, the other ends of the sheaths 52 and 54 of the first and second transmission cables 30 and 32 are fitted into cable bushes 96 and 98, and the cable bushes 96 and 98 are fixed to bend ends 106 of a bracket 104 on which pulleys 100 and 102 are supported.

Figure 7:
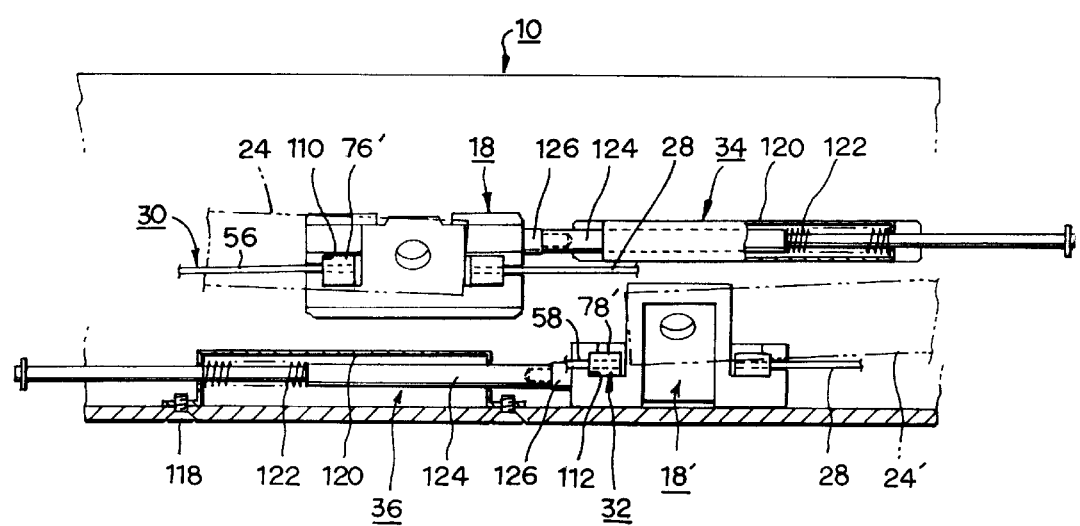
FIG. 7 is a plan view of embodiment of shock absorbers of FIG. 1.

As shown in FIGS. 1 and 7, a nipple 76' fixed to the other end of the internal cable 56 of the first transmission cable 30 wrapped over the pulley 100 of the bracket 104 and a pulley 108 of the frame 10 is fitted into a nipple recess 110 of the first slider 18, and a nipple 78' fixed to the other end of the internal cable 58 of the second cable 32 wrapped over the pulley 102 of the bracket 104 is fitted into a nipple recess 112 of the second slider 18'.

Figure 5:
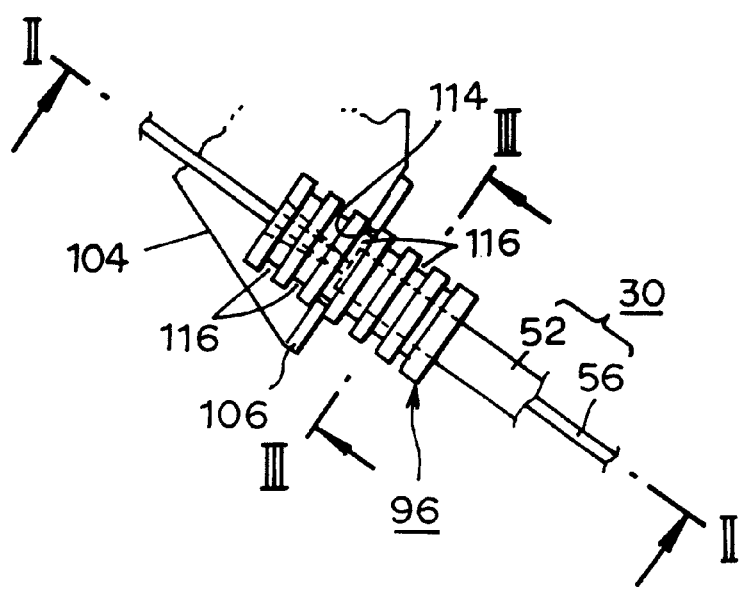
FIG. 5 is a plan view an embodiment of a rope bush of FIG. 1.
Figure 6A:
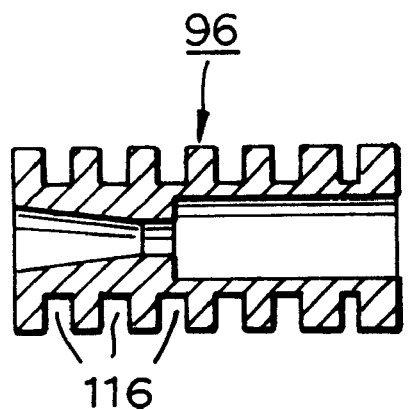
FIG. 6a is an enlarged cross-sectional view taken along line II—II of FIG. 5.
Figure 6B:
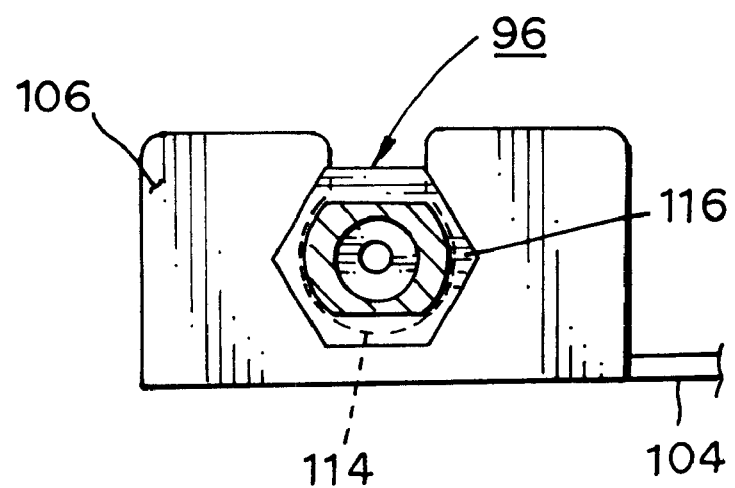
FIG. 6b is an enlarged cross-sectional view taken along line III—III of FIG. 5.

To control tensile force of the mediate cable 28 connecting the first and second sliders 18 and 18' and the first and second transmission cables 30 and 32, the cable bushes 96 and 98 are formed with a plurality of grooves 116, and a cutout portion 114 formed at the bent end 106 of the bracket 104 is selectively engaged with any one of the grooves 116 of the cable bushes 96 and 98 to achieve appropriate tensile force, as illustrated in FIGS. 5, 6a and 6b.

FIG. 7 illustrates embodiments of the first shock absorber 34 associated with the first slider 18 and the second shock absorber 36.

As shown in FIG. 7, the first and second shock absorbers 34 and 36 are constructed such that plungers 124, which are biased by elastic elements such as compression springs 122 received in housings 120 attached to the frame 10 by screws 118, are provided at ends thereof with cushion tips 126, which are to collide with the first and second sliders 18 and 18'.

Alternatively, the first and second shock absorbers 34 and 36 may be substituted with common pneumatic or hydraulic shock absorbers.

As shown in FIGS. 1 and 2, the drive assembly 26 is detachably mounted on the frame 10 via a bracket 128 by screws 130 and 132.

Accordingly, since the drive assembly 26 including the driving motor 50 generating operational noise can be mounted in a trunk of an automobile, which is isolated from an interior of an automobile, a problem caused by operational noise can be solved.

As shown in FIGS. 1 and 2, when the worm wheel 40 engaged with the worm 46 of the driving motor 50 of the drive assembly 26, and the rope drum 42 engaged with the worm wheel 40 to be rotated therewith are rotated clockwise by the driving motor 50, the internal cable 56 of the first transmission cable 30 connected to the first slider 18 is wound around the rope drum 42 while the internal cable 58 of the second transmission cable 32 connected to the second slider 18' is unwound from the rope drum 42.

Consequently, the mediate cable 28 connecting the first and second sliders 18 and 18', the internal cable 56 of the first transmission cable 30, and the internal cable 58 of the second transmission cable 32 are moved counterclockwise, so that the first and second sliders 18 and 18' are moved away from each other in the frame 10. With the relative outward movement of the first and second sliders 18 and 18', the first and second pivoting bars 24 and 24' pivotably coupled to the first and second sliders 18 and 18' are erected as indicated by a double-dash chain line in FIG. 1. As the first and second pivoting bars 24 and 24' are erected, the shade bar 16 coupled to the first and second pivoting bars 24 and 24' pulls out the sunshade screen 14 from the take-up shaft 12, thereby enabling a rear window of an automobile to be shaded At this point, since the rope drum 42 is rotated clockwise during deceleration while winding the spiral spring 90 fixed at its one end to the inner surface of the rope drum 42 and at its other end to the boss 84 of the gear box cover 44, rapid movement of the first and second sliders 18 and 18' can be prevented and a part of turning force of the driving motor 50 is stored in the spiral spring 90.

In the first and second shock absorbers 34 and 36, cushion tips 126 of the plungers 124, which compress the elastic elements 122, push the first and second sliders 18 and 18' by restoring force of the elastic elements 122, so that initial driving force of the first and second sliders 18 and 18' is increased, thereby permitting the first and second sliders to be smoothly moved.

When the worm wheel 40 and the rope drum 42 are rotated counterclockwise, the internal cable 56 of the first transmission cable 30 coupled to the first slider 18 is unwound from the rope drum 42 while the internal cable 58 of the second transmission cable 32 coupled to the second slider 18' is wound around the rope drum 42.

Accordingly, the mediate cable 28 connecting the first and second sliders 18 and 18', the internal cable 56 of the first transmission cable 30, and the internal cable 58 of the second transmission cable 32 are moved clockwise, so that the first and second sliders 18 and 18' are moved toward each other in the frame 10, as shown in FIGS. 1 and 7. With the relative inward movement of the first and second sliders 18 and 18', the first and second pivoting bars 24 and 24' pivotably coupled to the first and second sliders 18 and 18' are inclined to the horizontal position as indicated by a solid line in FIG. 1. As the first and second pivoting bars 24 and 24' are inclined, the shade bar 16 couples to the first and second pivoting bars 24 and 24' is lowered, thereby allowing the sunshade screen to be retracted and wound around the take-up shaft 12.

At this point, since rotational speed of the rope drum 42 is accelerated by the restoring force of the spiral spring 90, it is possible to wind the sunshade screen 14 rapidly.

As best seen in FIG. 7, when the first and second sliders 18 and 18' are moved closed to each other, that is, when winding of the sunshade screen 14 is almost completed, the cushion tips 126 fixed to ends of the plungers 124 of the first and second shock absorbers 34 and 36 first collide with the first and second sliders 18 and 18', thereby compressing the elastic elements 122. At this point, the elastic elements 12 absorb impact of rapid winding of the sunshade screen, thereby achieving soft landing of the first and second pivoting bars 24 and 24', and the shade bar 16 toward the frame 10. As such, the sunshade apparatus of the present invention enables the sunshade screen 14 to be completely wound around the take-up shaft 12 while absorbing impact of its rapid retraction.

As described above, the sunshade apparatus for an automobile according to the present invention provides advantages as follows.

Since the rope drum 42 is gently rotated by the spiral spring 90 when the sunshade screen 14 is raised, rapid movement of the first and second sliders 18 and 18' is prevented, thereby enabling smooth extension of the sunshade screen.

On the contrary, since the rope drum 42 is rapidly rotated by the spiral spring 90 when the sunshade screen 14 is lowered, the first and second sliders 18 and 18' can be quickly moved, thereby enabling quick retraction of the sunshade screen.

Moreover, when the sunshade screen 14 is raised, initial operation of the sunshade apparatus can be facilitated by increased initial driving force. When the sunshade screen is lowered, the sunshade screen can be gently wound around the take-up shaft.

Furthermore, since the drive assembly serving as a source of noise is mounted in a trunk isolated from an interior of an automobile, noise of the sunshade apparatus can be eliminated.

In addition, since the first and second transmission cables 30 and 32 are always maintained in a tightened condition, it is possible to prevent decrease of operational reliability due to loosening of the transmission cables 30 and 32 even though the sunshade apparatus is used for a long time.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A sunshade comprising:

a take-up shaft biased by an elastic element to be rotated in a winding direction;

a sunshade screen coupled at its one end to the take-up shaft and wound therearound;

a shade bar to which the other side of the sunshade screen is coupled;

a frame having first and second sliders slidably engaged therewith;

first and second pivoting bars pivotably coupled at both ends thereof to the shade bar and pivotally coupled at lower ends thereof to the first and second sliders;

a drive assembly including a driving motor adapted to be rotated in forward and reverse directions, a worm wheel rotated by the driving motor, and a rope drum engaged with the worm wheel and having a helical groove;

first and second transmission cables connecting the rope drum and the first and the second sliders and wound around the rope drum, and a mediate cable connecting the first slider and the second slider; and first and second shock absorbers associated with the first and second sliders, wherein each of the first and second shock absorbers is provided with a plunger elastically supported by an elastic element, the plunger being provided at its end with a cushion tip.

2. The sunshade apparatus as set forth in claim 1, in which the drive assembly is attached to the frame via a bracket by screws.

3. The sunshade apparatus as set forth in claim 1, in which each of the first and second transmission cables is provided with a cable bush having a plurality of grooves at its outer surface, the cable bush being fitted into a cutout portion of a bent end of the bracket through its grooves.

4. The sunshade apparatus as set forth in claim 1, in which the rope drum is biased by a spiral spring to be rotated.

* * * * *